United States Patent
Kim

(10) Patent No.: US 11,538,458 B2
(45) Date of Patent: Dec. 27, 2022

(54) ELECTRONIC APPARATUS AND METHOD FOR CONTROLLING VOICE RECOGNITION THEREOF

(71) Applicant: Samsung Electronics Co., Ltd., Suwon-si (KR)

(72) Inventor: Heejae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 17/022,344

(22) Filed: Sep. 16, 2020

(65) Prior Publication Data
US 2021/0082401 A1 Mar. 18, 2021

(30) Foreign Application Priority Data
Sep. 18, 2019 (KR) .......................... 10-2019-0114541

(51) Int. Cl.
*G10L 15/06* (2013.01)
*G10L 15/22* (2006.01)
*G10L 15/30* (2013.01)

(52) U.S. Cl.
CPC ............ *G10L 15/063* (2013.01); *G10L 15/22* (2013.01); *G10L 15/30* (2013.01); *G10L 2015/0635* (2013.01); *G10L 2015/223* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 10,847,152 | B2* | 11/2020 | Oh | ........................ G10L 15/063 |
| 11,217,244 | B2* | 1/2022 | Yi | ......................... G06F 40/295 |
| 11,367,438 | B2* | 6/2022 | Kim | .......................... G06N 3/08 |
| 2008/0167872 | A1* | 7/2008 | Okimoto | ................. G10L 15/22 |
| | | | | 704/E15.047 |
| 2015/0095024 | A1* | 4/2015 | Tsujino | ................... G10L 15/22 |
| | | | | 704/231 |

(Continued)

FOREIGN PATENT DOCUMENTS

| | | |
|---|---|---|
| JP | 2005-234332 A | 9/2005 |
| KR | 10-2005-0017885 A | 2/2005 |

(Continued)

OTHER PUBLICATIONS

International Search Report (PCT/ISA/210) and Written Opinion of the International Searching Authority (PCT/ISA/237) dated Dec. 23, 2020, in corresponding International Application No. PCT/KR2020/021279.

*Primary Examiner* — Marcus T Riley
(74) *Attorney, Agent, or Firm* — Staas & Halsey LLP

(57) ABSTRACT

Disclosed is an electronic apparatus capable of controlling voice recognition. The electronic apparatus increases a score of a category corresponding to a word included in user's utterance in a database when the instruction included in the user's utterance is present in the database. The electronic apparatus checks whether the score of the category corresponding to the word is equal to or greater than a preset value when the instruction is not present in the database. The electronic apparatus registers the instruction in the database so that the instruction is included in the category corresponding to the word when the score is equal to or greater than the preset value as the check result.

20 Claims, 8 Drawing Sheets

(56) References Cited

U.S. PATENT DOCUMENTS

| | | | | |
|---|---|---|---|---|
| 2016/0042611 A1* | 2/2016 | Abrahams | ............ | G07F 17/3269 463/9 |
| 2018/0261216 A1* | 9/2018 | Leeb | .................... | G10L 15/1815 |
| 2018/0286401 A1* | 10/2018 | Oh | ......................... | G10L 15/22 |
| 2019/0355365 A1* | 11/2019 | Kim | ......................... | G06F 3/167 |
| 2020/0051554 A1* | 2/2020 | Kim | ......................... | G10L 15/18 |
| 2020/0126565 A1* | 4/2020 | Kim | ......................... | G06F 3/167 |
| 2020/0365151 A1* | 11/2020 | Jo | ............................ | G10L 15/22 |
| 2021/0082401 A1* | 3/2021 | Kim | ......................... | G06F 40/30 |
| 2021/0327418 A1* | 10/2021 | Kim | ......................... | G06F 21/31 |
| 2021/0335381 A1* | 10/2021 | Park | ....................... | G10L 13/033 |
| 2021/0390959 A1* | 12/2021 | Jain | ......................... | G10L 17/04 |
| 2021/0407503 A1* | 12/2021 | Kim | ......................... | G10L 25/30 |
| 2022/0164071 A1* | 5/2022 | Choi | ....................... | G06F 3/0484 |

FOREIGN PATENT DOCUMENTS

| | | |
|---|---|---|
| KR | 10-0825690 B1 | 4/2008 |
| KR | 10-2017-0088164 A | 8/2017 |
| KR | 10-2019-0059509 A | 5/2019 |

* cited by examiner

FIG. 2

| CATEGORY | WORD | INSTRUCTION | SCORE |
|---|---|---|---|
| MUSIC | AAA<br>BBB<br>CCC<br>⋮ | PLAY<br>TURN ON<br>REPRODUCE<br>⋮ | 13 |
| SINGER | aa<br>bb<br>cc<br>⋮ | | 5 |

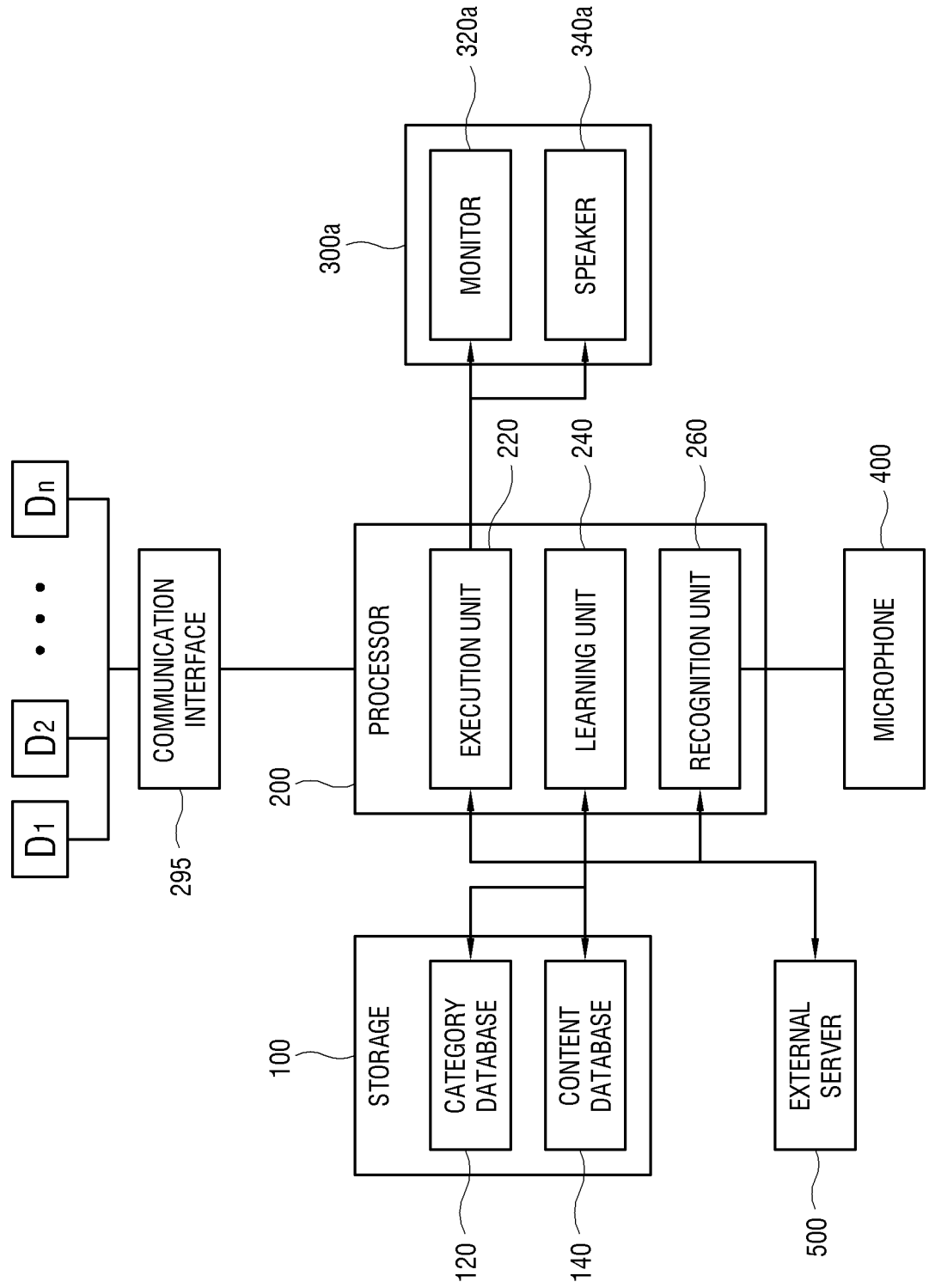

ELECTRONIC APPARATUS AND METHOD FOR CONTROLLING VOICE RECOGNITION THEREOF

CROSS-REFERENCE TO RELATED APPLICATION

This application is based on and claims priority under 35 U. S. C. § 119 to Korean Patent Application No. 10-2019-0114541, filed on Sep. 18, 2019, the disclosure of which is herein incorporated by reference in its entirety.

BACKGROUND

1. Field

The disclosure relates to an electronic apparatus and a method for controlling voice recognition thereof.

2. Discussion of Related Art

With the development of voice recognition technology, voice recognition technology has been applied to various electronic apparatuses, such as a TV, a speaker, and a mobile phone. The typical method for controlling voice recognition converts and recognizes user's utterance into data, and analyzes and executes the contents of the recognized utterance. At this time, the meaning of the recognized utterance is checked through an inquiry to the database that has been built in advance.

For example, when a user utters "Let me know tomorrow's weather", a user's instruction is "Let me know" and a target to perform the instruction is "tomorrow's weather." There is the category <weather> in the database. The category includes several words such as 'tomorrow's weather', 'today's weather', 'New York weather', 'Washington weather', 'weather forecast', and 'weather situation'. In addition, various words, such as "Let me know," "Tell me", and "How about?" as instructions that a user expects to want about the <weather> category are registered in advance in the database as instructions to notify the user about the weather. Therefore, when the user utters "Let me know tomorrow's weather," a voice recognition system recognizes the utterance as meaning to provide information on the tomorrow's weather, and performs the corresponding operation.

However, such a conventional voice recognition system relies on a database built in advance to understand the user's intention, and therefore, when words or instructions not predefined are input, the voice recognition fails. For example, when the user utters "Are you wonder about tomorrow's weather", if the instruction "Are you wonder" is not registered in advance in the database, the voice recognition system may not recognize what operation to perform for "tomorrow's weather". In this case, the system determines that the recognition has failure, and the operation intended by the user is not executed. Therefore, when the user intends to execute a certain command, the user may execute the desired operation only when instructions predefined in the database need to be uttered.

SUMMARY

One or more embodiments of the disclosure is to provide a method for understanding user's intention and performing the corresponding operation even if an instruction in user's utterance is not predefined in a database.

One or more embodiments of the disclosure is to provide a method for increasing success probability of voice recognition later by actively incorporating unexpected instructions uttered by various users into new instructions by machine learning even when instructions in user's utterance are not previously defined in a database.

According to an aspect of an embodiment, provided is an electronic apparatus including a processor.

The processor may be configured to increase a score of a category corresponding to a word included in user's utterance in a preset database based on an instruction included in the user's utterance being present in the database. The processor may be configured to check whether the score of the category corresponding to the word is equal to or greater than a preset value based on the instruction being not present in the database, and register the instruction in the database so that the instruction is included in the category corresponding to the word based on the score being equal to or greater than the preset value.

The processor may be configured to check the categories for each of the word based on the plurality of words being included in the utterance and identify the categories corresponding to the instructions in the utterance based on the scores of the checked categories.

The processor may be configured to create a new category for the word included in the utterance in the database based on the word included in the utterance being not present in the database.

The processor may be configured to select one of the instructions included in the category for the word as the instruction for the word based on the instruction in the utterance being not present in the database.

The processor may be configured to select any one of the categories for each of the words based on the score based on the plurality of words being included in the utterance.

The processor may be configured to receive user's check for the selected instruction.

The electronic apparatus according to the disclosure may include a storage configured to store the database including each field for the word, the instruction, the category, and the score.

The electronic apparatus according to the disclosure may include a communication interface configured to perform communication for querying the database on an external database server in which the database is stored.

The electronic apparatus according to the disclosure may include an executor configured to execute an operation corresponding to the word and the instruction.

The electronic apparatus according to the disclosure may include an output interface configured to output a result of the operation executed by the executor.

The electronic apparatus according to the disclosure may include an interface configured to transmit, to the output device, the result of the operation executed by the executor so that an external output device displays the result of the operation.

The electronic apparatus according to the disclosure may include a microphone configured to receive a sound of the utterance and transmit the received sound to the recognitionor.

The electronic apparatus according to the disclosure may include a receiver configured to receive a signal for the sound from an external device including a microphone receiving a sound of the utterance and transmit the received signal to the recognitionor.

According to an aspect of an embodiment, provided is a method for controlling voice recognition of an electronic apparatus, including: a) increasing a score of a category corresponding to a word included in user's utterance in a preset database based on an instruction included in the user's utterance being preset in the preset database; and b) checking whether the score of the category corresponding to the word is equal to or greater than a preset value based on the instruction being not present in the database to register the instruction in the database so that the instruction is included in the category corresponding to the word based on the score being equal to or greater than the preset value.

In the step b), based on the plurality of words being included in the utterance, the category including the instruction may be identified based on the scores of the categories for each of the words.

The method for controlling voice recognition of an electronic apparatus according to the disclosure may further include c) creating a new category for the word in the database based on the word included in the utterance being not present in the database.

The method for controlling voice recognition of an electronic apparatus according to the disclosure may further include d) selecting any one of the instructions in the category for the word based on the instruction being not present in the database.

In the step d), based on the plurality of words being included in the utterance, any one of the categories for each of the words may be identified based on the score.

The method for controlling voice recognition of an electronic apparatus according to the disclosure may further include e) receiving user's check for the instruction selected in the step d).

The method for controlling voice recognition of an electronic apparatus according to the disclosure may further include f) executing an operation on the word in the utterance according to the instruction selected in the step d).

BRIEF DESCRIPTION OF THE DRAWINGS

The above and other aspects, features, and advantages of certain embodiments of the disclosure will be more apparent from the following description taken in conjunction with the accompanying drawings.

FIG. 2 is a plan view illustrating a structure of a database of FIG. 1.

FIGS. 5 to 8 are diagrams illustrating modifications of FIG. 1, respectively.

DETAILED DESCRIPTION

Hereinafter, various embodiments of the disclosure will be described in more detail with reference to the drawings.

However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In the disclosure, an expression "have", "may have", "include", "may include", or the like, indicates existence of a corresponding feature (for example, a numerical value, a function, an operation, a component such as a part, or the like), and does not exclude existence of an additional feature.

In the disclosure, an expression "A or B", "at least one of A and/or B", "one or more of A and/or B", or the like, may include all possible combinations of items enumerated together. For example, "A or B", "at least one of A and B", or "at least one of A or B" may indicate all of (1) a case in which at least one A is included, (2) a case in which at least one B is included, or (3) a case in which both of at least one A and at least one B are included.

In the description of the disclosure, the shape, shape, structure, location, and the like do not limit the protection scope of the disclosure unless it is essential to the implementation of the disclosure.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, an expression "an apparatus configured to" may mean that the apparatus may "do" together with other apparatuses or components. For example, a "sub-processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In the description of the disclosure, the term electronic apparatus may be all types of electronic device such as a TV, a mobile phone, a set-top box, a speaker, and the like. The electronic apparatus of the disclosure includes all electronic devices that require a user to perform an intended operation by inputting a certain command.

Figure 1:
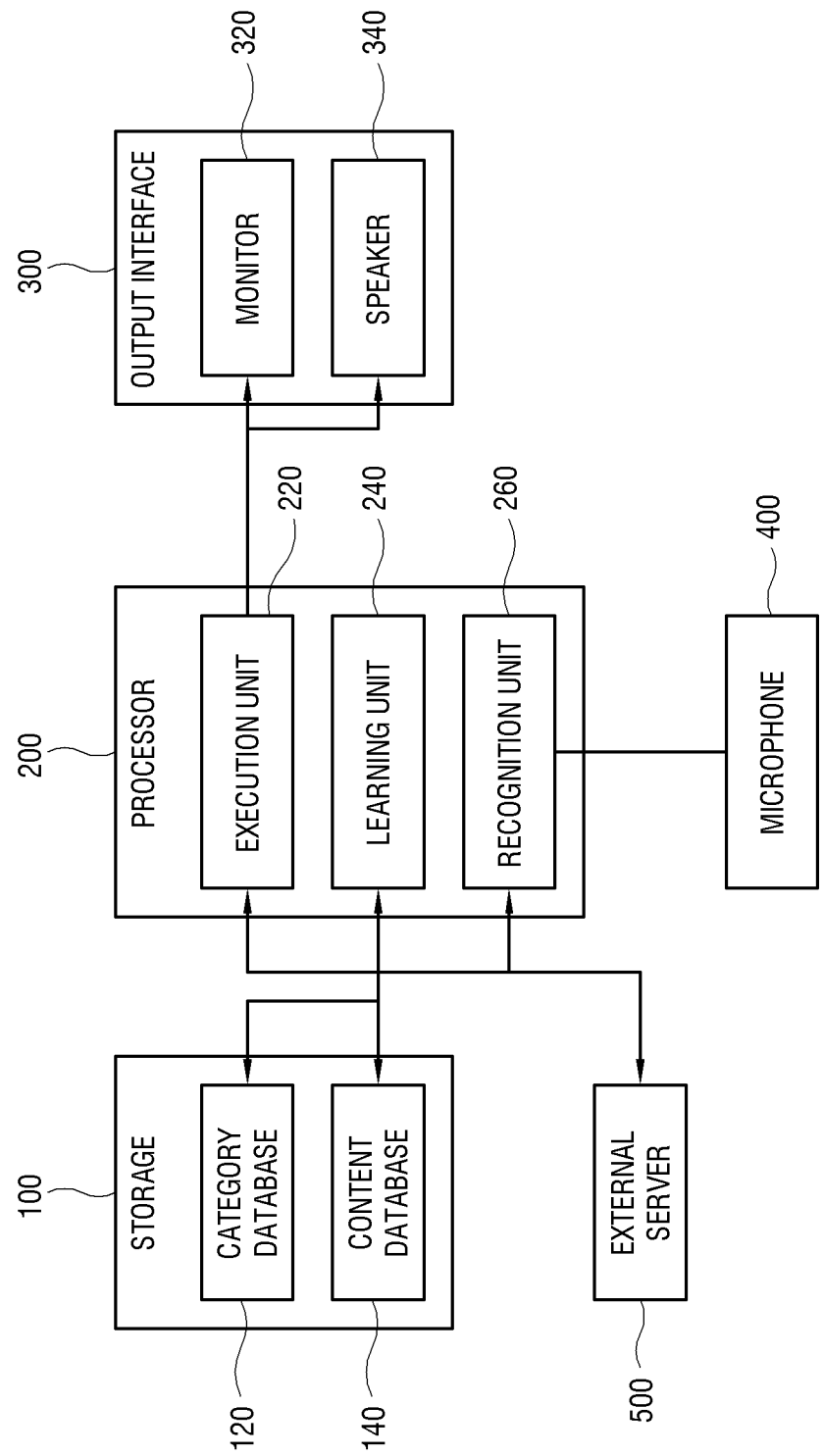
FIG. 1 is a block diagram of an electronic apparatus according to the disclosure.

FIG. 1 is a block diagram of an electronic apparatus according to the disclosure.

The electronic apparatus of FIG. 1 includes a storage 100, a processor 200, an output interface 300, and a microphone 400. The electronic apparatus may be a device having both a display and a memory, such as a TV or a smartphone. Alternatively, the electronic apparatus may be an apparatus that recognizes a user's voice and provides desired information as sound, as in, for example, an AI speaker that is commercially used in recent years.

The storage 100 includes a category database 120 and a content database 140.

The category database 120 is a database built in advance to recognize the contents of the user's utterance and to search for the meaning of the utterance. The category database 120 includes words to be recognized, categories set for each word, instructions corresponding to each category, and fields for scores of each category. FIG. 2 is a diagram illustrating an example of the category database 120. The category database 120 includes four fields, that is, a category field, a word field, an instruction field, and a score field.

The word field includes each word expected to be included in the user's utterance, and the category field includes a category name assigned to each of these words by classifying these words by category. FIG. 2 illustrates a state in which categories for <music> and <singer> are included. The instruction field is established corresponding to each category, and includes instructions executed for the corresponding category. FIG. 2 illustrates a state in which instructions such as 'play', 'turn on', and 'reproduce' are included for the <music> category. For example, the instruction to "play" corresponds to an instruction to play the corresponding music. Therefore, for example, the word 'AAA' and the instruction "play" is included in the utterance "play AAA", and the instruction 'play' included in the <music> category which is a category including the word 'AAA' is present in the category database 120, so the voice recognition system may determine the user's utterance as a request to execute the operation of playing the AAA.

The instructions may differ by category. For example, for the <music> category, instructions to mainly play the music are included, and in addition, for example, instructions to provide information related to the corresponding music may be included. As another example, for the <weather> category, instructions meaning a request to give a weather forecast for a specific time or a specific location, that is, instructions such as "Let me know", "Tell me", and "How about?" may be mainly included. In this way, instructions are set in advance to match the characteristics of the content included in the corresponding category by category. Such an instruction may be set by a manufacturer of the electronic apparatus according to the disclosure. In addition, the user of the electronic apparatus according to the disclosure may register his/her desired instructions in the category database 120.

The score field corresponds to each category and records the score of the corresponding category. The scores of each category increases according to a process of the disclosure described below. FIG. 2 illustrates a state in which scores of 13 points and 5 points are assigned to the <music> category and the <singer> category, respectively.

The content database 140 stores various types of content to be executed according to a user's command. For example, the content database 140 stores various sound sources as content corresponding to the <music> category, for example, sound sources such as 'AAA', 'BBB', and 'CCC' which are contents included in the word field of FIG. 2. In addition, in the case where the <movie> category is present, video data of various movies is stored as the content of the corresponding category.

On the other hand, in the case of information to be provided from the outside in the content to be executed, the external server 500 holds the information. As an example, in the case of weather information, a server operated by a meteorological agency or other weather information providing organization updates and provides related information in real time. If the user wants the weather forecast, the electronic apparatus receives the corresponding information from the external server 500.

The processor 200 is configured to perform a method for controlling voice recognition according to the disclosure, and includes an execution unit 220, a learning unit 240, and a recognition unit 260.

The microphone 400 provided in the electronic apparatus receives a user's utterance sound and transmits the received user's utterance sound to the recognition unit 260 as an electrical signal. The recognition unit 260 as a recognitionor queries the category database 120 for the received utterance. According to the query result, the recognition unit 250 classifies utterances identified and unidentified in the category database 120 as a successful utterance and a failed utterance, respectively. The recognition unit 260 finds the instruction most likely to match the user's intention for the failed utterance and transmits the found instruction to the execution unit 220 to perform the operation according to the corresponding instruction.

The learning unit 260 increases the score of the corresponding category in the category database 120 for the utterance classified by the recognition unit 260 as the successful utterance. This increasing score is used as a criterion for incorporating a new instruction into an instruction in the future failed utterance.

The execution unit 220 as an executor executes an operation corresponding to the user's utterance based on the recognition result of the recognition unit 260. For example, the execution unit 220 reads the corresponding content stored in the content database 140 in the storage 100 to reproduce certain content, and transmits the read content to the output interface 300 for playback.

The output interface 300 includes a monitor 320 and a speaker 340 to display the operation executed by the execution unit 220. For example, when a movie is played, the monitor 320 is controlled by the execution unit 220 to display an image, and the speaker 340 is controlled to output sound.

Hereinafter, the operation of the electronic apparatus according to the disclosure having the above configuration will be described in detail with reference to FIGS. 3 and 4.

Figure 3:
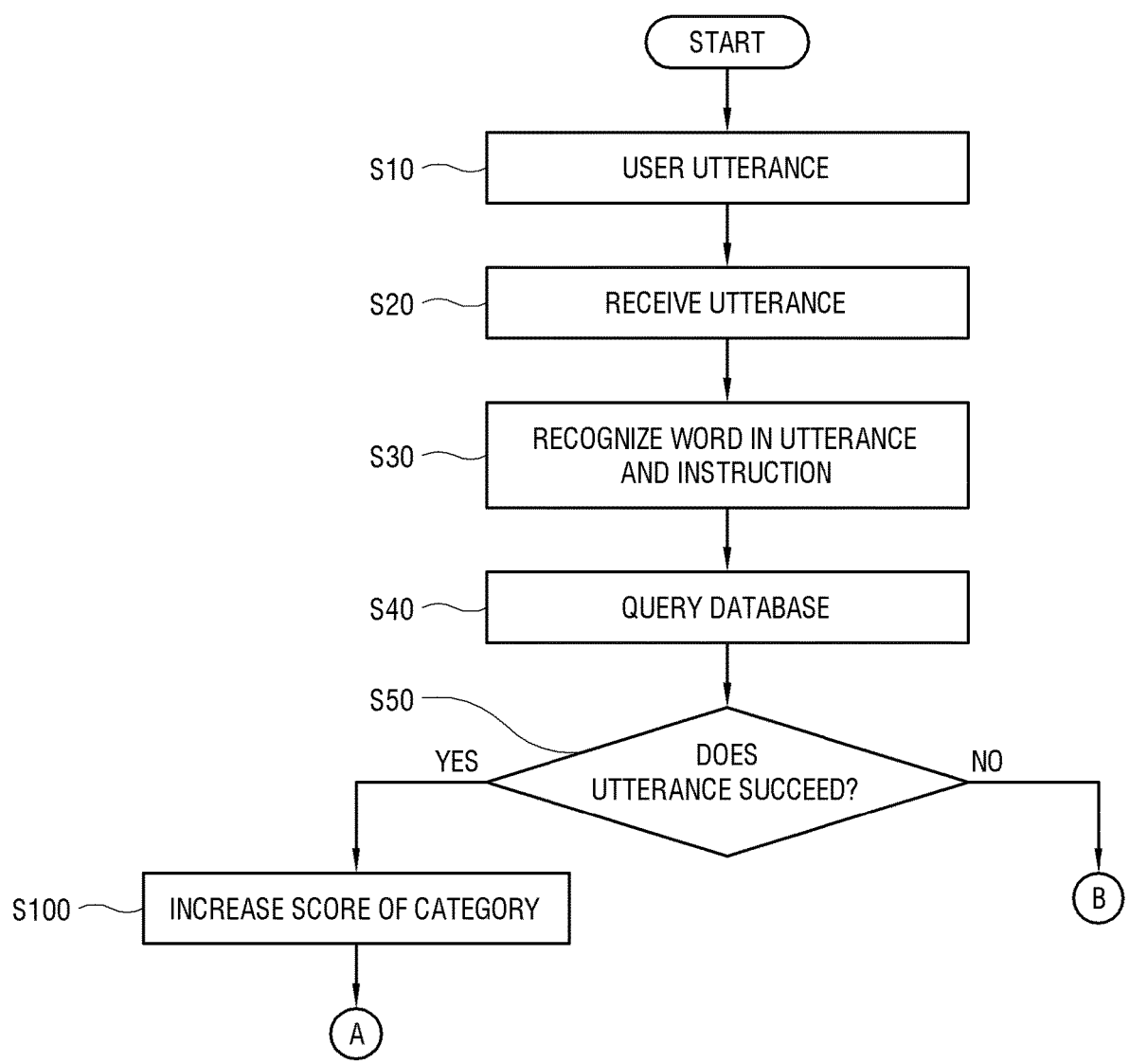
FIGS. 3 and 4 are flowcharts of a method for controlling voice recognition performed by the electronic apparatus of FIG. 1.
Figure 4:
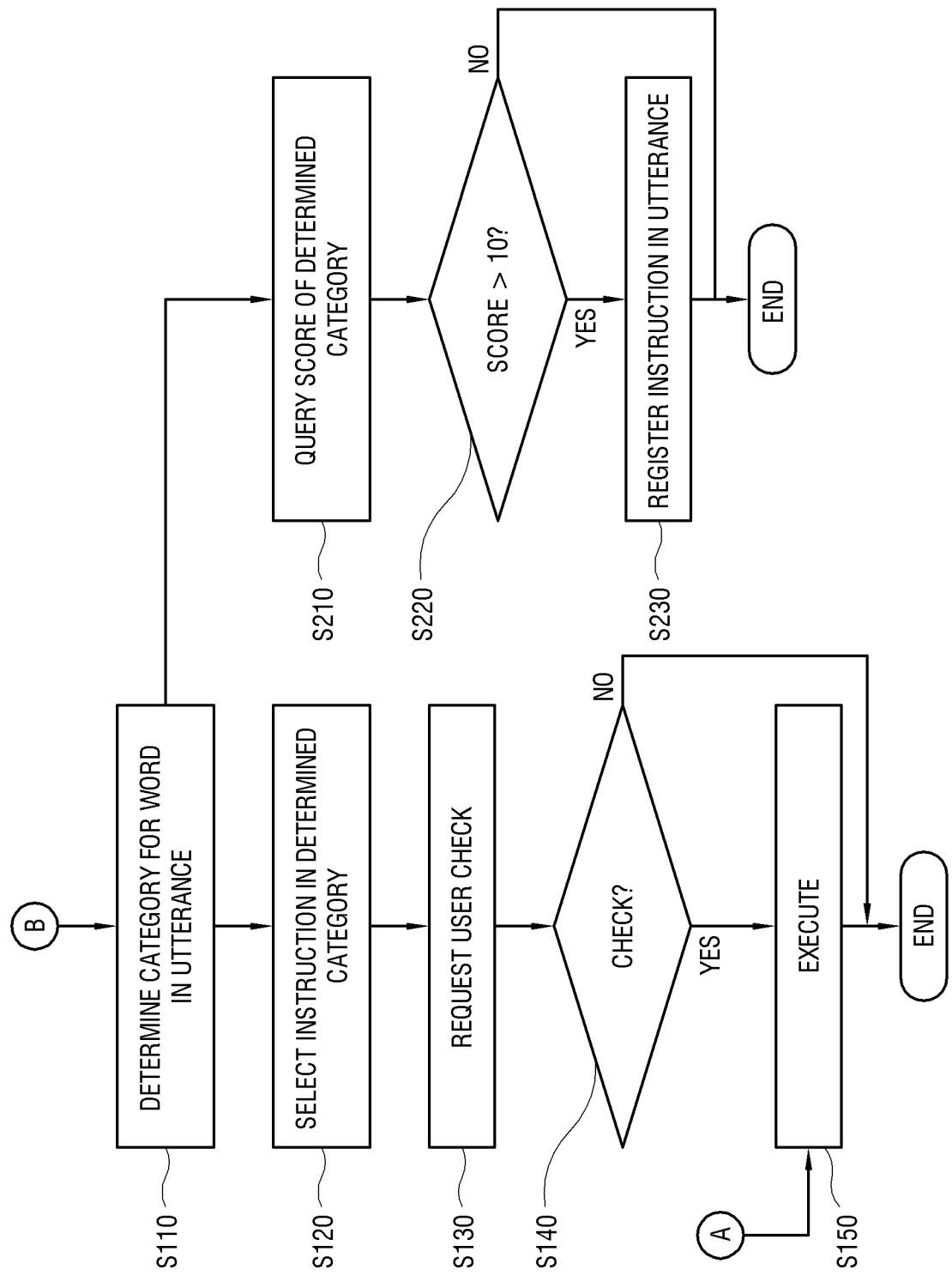

FIGS. 3 and 4 are flowcharts of a method for controlling voice recognition performed by the electronic apparatus of FIG. 1.

When the user utters (S10), the uttered sound is received by the microphone 400 (S20).

The recognition unit 260 receives a signal for the user's utterance from the microphone 400 and recognizes words and instructions included in the utterance (S30). For example, when the user utters "Play Yesterday", the recognition unit 260 recognizes the word "Yesterday" and the instruction "Play".

The recognition unit 260 queries the category database 120 to check whether or not the recognized instruction is present (S40). As the check result, when the instruction is present, the user's utterance is classified as the successful utterance, and when the instruction is not present, the user's utterance is classified as the failed utterance (S50). For example, since the instruction "Play" is present in the database of FIG. 2, the recognition unit 260 classifies the utterance "Play Yesterday" as the successful utterance. When the user's utterance is "I want to hear Yesterday", the instruction "I want to hear" is not present in the instruction field of FIG. 2, so the corresponding utterance is classified as the failed utterance.

At this time, the recognition unit 260 may classify the successful and failed utterances in consideration of the instructions and the words included in the utterance together. That is, the recognition unit 260 first queries the category database 120 to check the recognized word category, and checks whether the instruction included in the utterance is present in the instruction field corresponding to the identified category. For example, the word "Yesterday" included in the utterance "Play Yesterday" is a word included in the <music> category. Therefore, the recognition unit 260 determines whether or not there is the instruction "play" among the stored instructions corresponding to the <music> category.

The information on the utterance classified as the successful utterance is transmitted to the learning unit 260. The learning unit 240 increases, in the category database 120, the score of the category for the word included in the utterance classified as the successful utterance by the recognition unit 260 (S100). For example, when the successful utterance "Play Yesterday" is created, the learning unit 240 increases the current score of the <music> category which is a category for "Yesterday" by one. In the case of the <music> category illustrated in FIG. 2, the value of the score field increases from 13, which is the current score, to 14. Meanwhile, the recognition unit 260 transmits the successful utterance to the execution unit 220, and the execution unit 220 reads the corresponding data from the content database 140 to perform the operation corresponding to the successful utterance and drives the output interface 300 to perform the corresponding instruction on the read data (S150). Accordingly, the music "Yesterday" is played from the speaker 340.

For the failed utterance, the recognition unit 260 determines a category for the word in the utterance (S110). For example, the utterance "I want to hear Yesterday" is classified as the failed utterance, and for the utterance classified as the failed utterance, the <music> category which is the category including the "Yesterday" is determined as the category for the word in the utterance.

There are cases where there are the plurality of words in the failed utterance. For example, in the case of the utterance "I want to hear the Beatles' Yesterday," the word "Beatles" is included in the <singer> category, and the word "Yesterday" is included in the <music> category. When there are a plurality of categories including a plurality of words as described above, the recognition unit 260 checks categories for each word and determines any one of the plurality of categories as the category for the word in the utterance. At this time, the recognition unit 260 determines a category having the highest score among the respective categories as a category for utterance.

The recognition unit 260 selects any one of the instructions corresponding to the determined category as the instruction for the failed utterance (S120). The recognition unit 260 checks which instruction is most frequently used for the corresponding category to select an instruction. For example, in the case of the <music> category, if the instruction "play" is used most frequently, the recognition unit 260 selects the instruction as one corresponding to the instruction to "play" the instruction "I want to hear" included in the failed utterance.

The recognition unit 260 requests a user to check the selected instruction (S130). The user's check request may be made by driving the output interface 300 through the execution unit 220. For example, the speaker 340 is driven to output the sound "Do you want to play Yesterday?". As a result, in response to the user's failed utterance "I want to hear Yesterday", the speaker 340 outputs a sound requesting the user to check whether or not he or she wants to play Yesterday. When the user utters an affirmative voice such as "yes" or "so" in response to the output sound, the recognition unit 260 receives the voice through the microphone 400 to check that the determination of the recognition unit 260 matches the user's request (S140).

When the recognition unit 260 checks the affirmation, the recognition unit 260 transmits the check result to the execution unit 220, and the execution unit 220 executes the check result to play the music "Yesterday" through the speaker 340 (S150).

On the other hand, as the category is determined by the recognition unit 260 in step S110 for the failed utterance, the learning unit 240 queries the score of the determined category (S210).

For example, for the instruction "I want to hear Yesterday" which is the failed utterance, the score of the <music> category, which is a category determined by the recognition unit 260, is 13 points in FIG. 2. Therefore, the instruction "I want to hear", which is the instruction in the failed utterance, is added as a new instruction for the <music> category in the category database 120. At this time, the newly added instruction is selected by the recognition unit 260 in step S120 and registered as an instruction having the same operation as the instruction checked by the user in step S140. For example, the learning unit 240 newly adds the instruction "I want to hear", and gives the instruction a meaning of a playback operation instruction. As a result, the utterance including the instruction "I want to hear" the word in the <music> category have been classified as the failed utterance until now, but are subsequently classified as the successful utterance.

On the other hand, when there are a plurality of words in the failed utterance, the registration of the instruction is performed for the category having the highest score among the categories for the plurality of words. For example, when the failed utterance is "I want to hear the Beatles' Yesterday", the utterance includes the word "Beatles" which is the <singer> category and the word "Yesterday" which is the <music> category. Therefore, the recognition unit 260 checks the <singer> category and the <music> category for the failed utterance. The learning unit 240 checks the scores of the categories. In FIG. 2, the score of the <singer> category is 5 and the score of the <music> category is 13. Therefore, the learning unit 240 selects the instruction "I want to hear" the <music> category as a target to be registered.

According to the above process, the score of the corresponding category for the utterance classified as the successful utterance increases by the learning unit 240. When this process is repeated, the score of the corresponding category gradually increases to be equal to or greater than a preset value, and for such a category, the instruction in the failed utterance is newly added as a valid instruction. Accordingly, even if all instructions generated by various users are not previously recorded in the category database 120, new instructions are added to the category in which many successful utterances have occurred by a machine learning method.

A high score of a category means that the words and instructions in the corresponding category are frequently uttered by the user. The instructions set for any one of the categories usually have the same or similar meaning. In the case of the <music> category, for example, various instructions such as "play" and "turn on" means to "play" music. Therefore, if any category has been frequently targeted for successful utterance, it means that the word in that the words in the category have been frequently used as a target for performing instructions having the same meaning. Therefore, if the word in the category is uttered after a category is frequently used by a user, it may be assumed that even if the instruction in the utterance is an instruction that has not been registered in advance, the instruction is an instruction frequently performed for the corresponding category. Accordingly, the voice recognition suitable for various users' intentions is appropriately performed by the process, and the number of cases where it is determined to be the failed utterance is reduced.

In addition, even if the instruction included in the currently input utterance is not present in the category database 120, the instruction matching the user's intention is selected by the recognition unit 260 through a query for the corresponding category. Therefore, even if the instruction is classified as the failed utterance, the instruction assumed to be the user's intention is selected and executed without immediately deriving the result of the recognition failure, and furthermore the instruction is checked by the user.

Therefore, the utterance recognized as the failed utterance is highly likely to induce the same result as the successful utterance.

Meanwhile, the word included in the failed utterance may be a word that is not present in the category database 120. For example, in the case of the utterance "I want to hear hope", the word "hope" may be a word that is not included in any category. In this way, when the word included in the failed utterance is not present in the category database 120, the learning unit 240 may create a new category for the word included in the failed utterance in the category database 120. The same process is applied to the new category created as above after the creation.

The score stored in the category database 120 in the disclosure means a kind of weight. The above embodiment exemplifies a method of increasing a score of 1 point each time for the successful utterance, but may be modified to a method of gradually lowering an increasing score of the successful utterance as the number of successful utterances increases. In addition, a method of registering the instruction in the failed utterance as a new instruction in the category database 120 when the score of the successful utterance exceeds a preset value is provided, but the preset value may not be set as a single value, but may be set as values of several steps. In this case, for example, for a category whose score exceeds a value of a first step, the instruction of the failed utterance is not registered immediately, the corresponding instruction is simply recorded in the category database 120, and when the corresponding instruction is input a certain number of times until the score exceeds a value of a second step, the above embodiment may be modified to the method of recording the instruction in the database 120.

On the other hand, in the disclosure, the recognition unit 260 may be constituted by a module of performing an operation of performing voice recognition by converting user's utterance into sound to text (STT), an operation of checking a category through the category database 120, and the like, or a module in which a module for voice recognition and a module of querying the category database 120 are separated. Further, in this case, the two hardware modules can be configured to be spaced apart from each other remotely to enable data communication with each other through a wired or wireless communication network. In addition, the apparatus used by the user simply has only a microphone or only a receiver 280 connected to the microphone, and some or all of the learning unit 240, the recognition unit 260, and the execution unit 220 may be configured to be provided in an apparatus or a server that is capable of data communication with the apparatus used by the user through the wired or wireless communication network.

Figure 5:
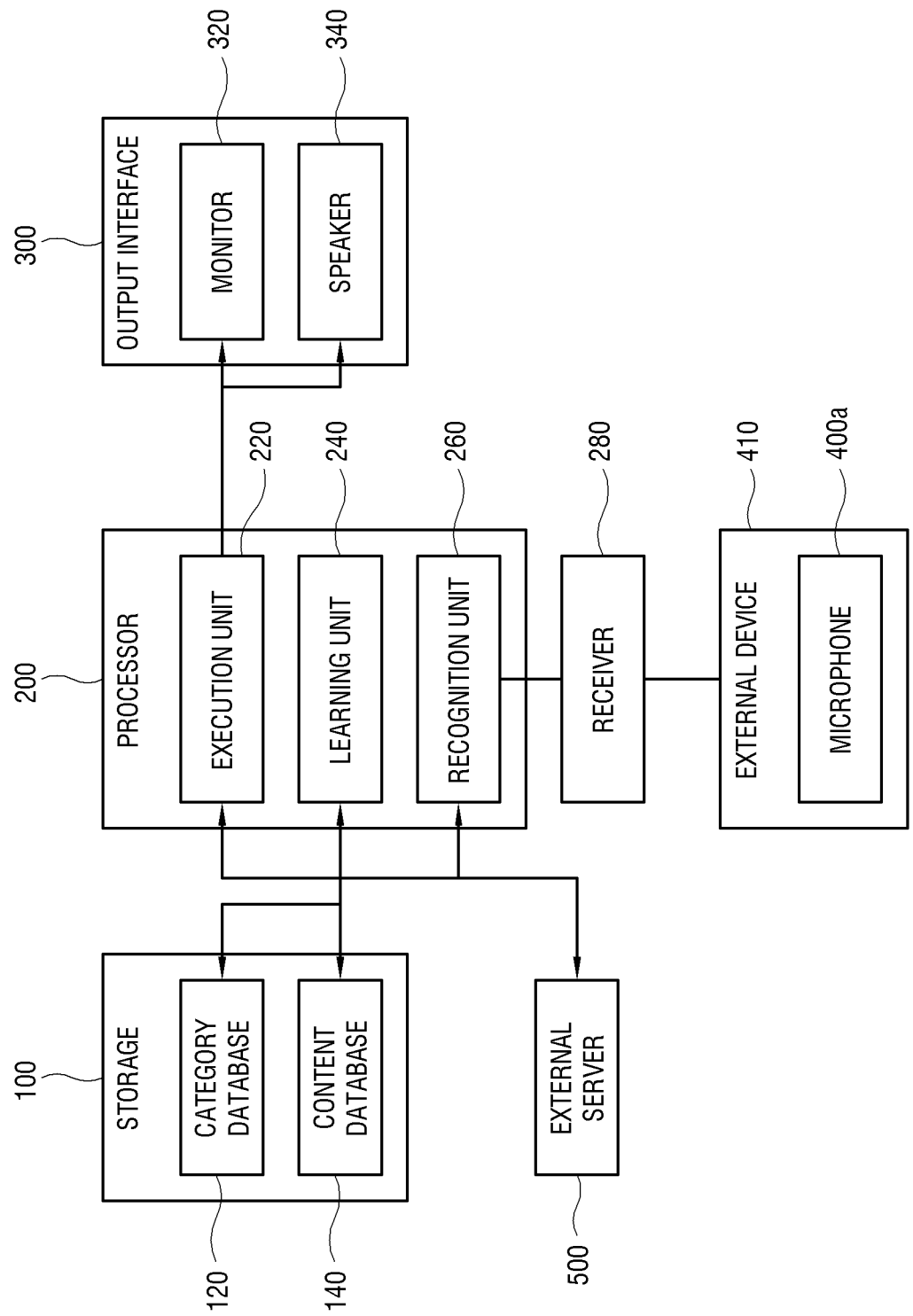
Figure 6:
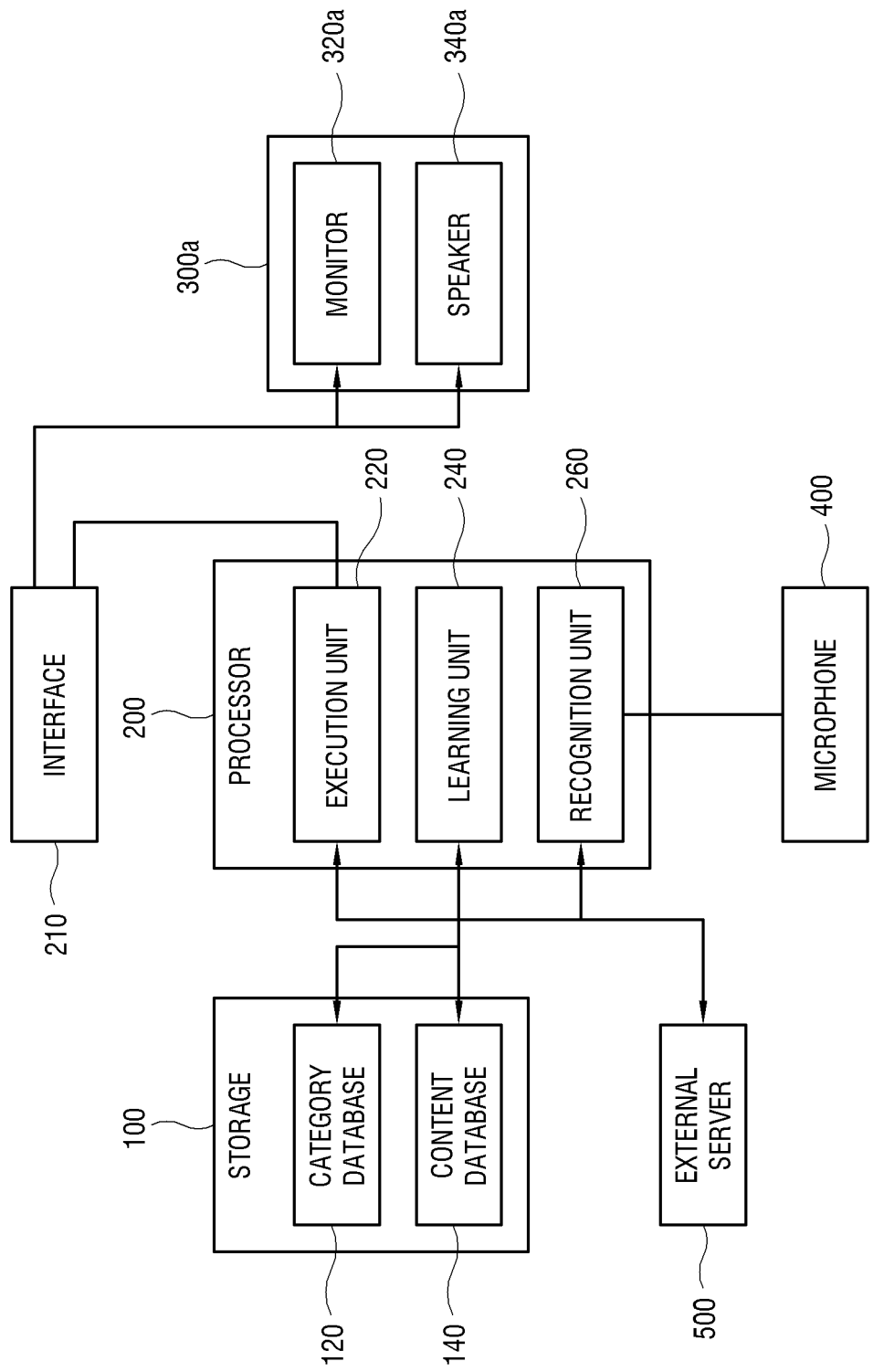
Figure 7:
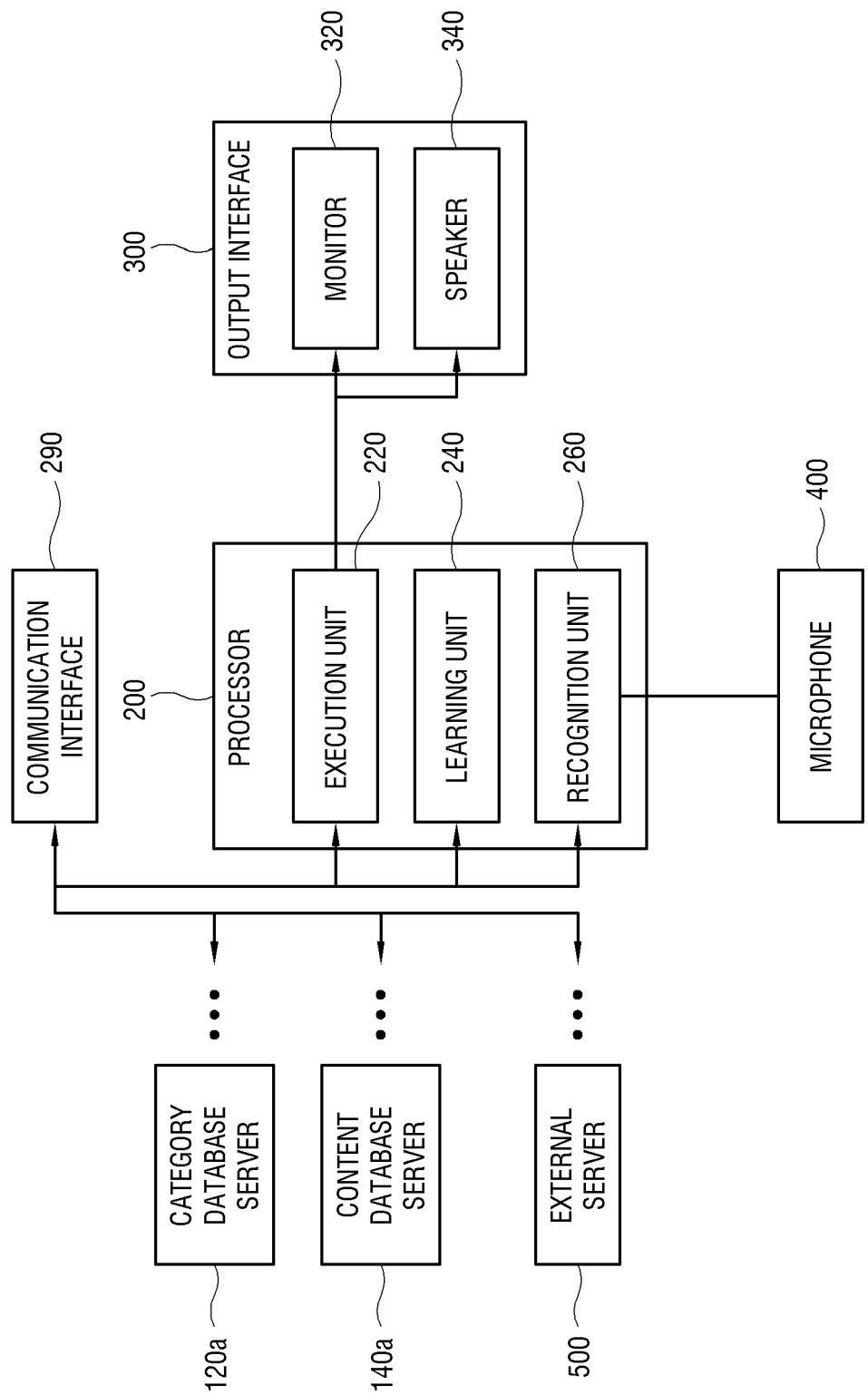

FIGS. 5 to 7 are views showing other embodiments of the disclosure, and illustrate various implementation examples of an electronic apparatus equipped with a voice recognition system of the disclosure. In the following embodiments, the same reference numerals are assigned to the same parts as those in the embodiment illustrated in FIG. 1 and duplicate descriptions are omitted. However, components denoted by the same reference numerals as in FIG. 1 do not mean that the components are completely identical.

FIG. 5 illustrates an implementation example of a method in which the electronic apparatus of the disclosure communicates with a separate external device 410. In the embodiment of FIG. 1, the microphone 400 is included in the electronic apparatus, and the microphone 400 digitizes an analog voice signal and transmits the digitized analog voice signal to the processor of the electronic apparatus. However, in the embodiment of FIG. 5, a microphone 400a is provided in a separate external device 410, instead of being provided in a part included in the electronic apparatus. The microphone 400a digitizes the analog voice signal, and the external device 410 transmits the digitized voice signal to the electronic apparatus side through a communication method such as Bluetooth, infrared communication, and WiFi. In the embodiment of FIG. 5, the microphone 400 as illustrated in FIG. may be provided inside the electronic apparatus together with the microphone 400a in the external device 410.

In the example of FIG. 5, the external device 410 may be, for example, a device such as a remote control, and the corresponding electronic apparatus may be a device such as a TV. At this time, the remote control includes, for example, a case where a smartphone is used as a remote control by installing a remote control app capable of controlling a TV on the smartphone. As another example, the external device 410 may be a device that performs a function equivalent to that of the electronic apparatus, not a device incidental to the electronic apparatus, such as a remote control. For example, both the electronic apparatus and the external device may be a smartphone, the electronic apparatus may be a TV, and the external device may be a smartphone.

The electronic apparatus further includes the receiver 280, which may communicate with the external device 410. The communication between the external device 410 and the receiver 280 may be performed in various ways such as Bluetooth, infrared communication, communication through a Wi-Fi network, wired communication, and the like. When the user utters to the external device 410, the microphone 400a of the external device 410 receives the utterance and transmits the utterance to the receiver 280, and the receiver transmits the utterance to the recognition unit 260. The process of the voice recognition control is the same as the above-described embodiment.

On the other hand, in the present embodiment, the external device 410 may be constituted by a device such as a smartphone or an AI speaker used by the user, and the electronic apparatus itself may be constituted by a server provided externally. For example, when the user controls the IPTV at home with voice using an AI speaker, the AI speaker is equipped with the microphone 400a as an external device 410 to receive the user's utterance, and the electronic apparatus may be constituted by the AI speaker and a server of a carrier connected through a wired or wireless network to perform the voice recognition at a remote location.

According to the present embodiment, the microphone 400a that directly receives the user's utterance and the electronic apparatus that receives the sound signal transmitted from the microphone 400a to perform the process of the disclosure is manufactured as separate independent devices. Accordingly, it is possible to control the operation of the electronic apparatus through the user's utterance at a remote location.

FIG. 6 illustrates an implementation example of a method in which the electronic apparatus of the disclosure communicates with a separate output device 300a without including the output interface 300. In the embodiment of FIG. 1, the output interface 300 is included in the electronic apparatus. However, in the embodiment of FIG. 6, the output device 300a is provided in a separate external device 410, instead of being provided in a part included in the electronic apparatus. The output interface 300 as illustrated in FIG. 1 may also be provided in the electronic apparatus of FIG. 6.

The display device 300a includes a monitor 320a and a speaker 340a. Here, the electronic apparatus may be, for example, a device such as a smartphone, and the output device 300a corresponding thereto may be a device such as a TV. As another example, the electronic apparatus may be constituted by the AI speaker and the output device may be constituted by a TV. In this case, the speaker 340 may be provided inside the electronic apparatus, and the monitor 320a may be provided inside the output device 300a. On the other hand, the monitor 320a may be configured to be provided inside the electronic apparatus and the speaker 340a may be configured to be provided outside the electronic apparatus.

The electronic apparatus has an interface 210 therein. The interface 210 provides a communication port connected to the output device 300a. The interface 210 may be a port capable of simultaneously transmitting video/audio signals, such as HDMI, DP, and Thunderbolt. Also, the interface 210 may be constituted by ports through which video signals and audio signals are transmitted to different paths.

FIG. 7 illustrates an implementation example of a method in which the electronic apparatus of the disclosure communicates with a separate servers 120a and 140a without including the storage 100. In the embodiment of FIG. 1, the storage 100 is included in the electronic apparatus. However, in the embodiment of FIG. 7, the storage 100 is provided in a separate external device 410, instead of being provided in a part included in the electronic apparatus. The storage 100 may also be provided inside the electronic apparatus of FIG. 7.

In the embodiment of FIG. 7, the storage 100 includes a category database server 120a for storing a category database and a content database server 140a for storing a content database. The electronic apparatus includes a communication interface 290 which functions as a communication function between the servers 120a and 140a and the processor 200. The communication interface 290 may communicate with the servers 120a and 140a using a communication method such as a wired/wireless Internet network or Bluetooth.

When the electronic apparatus of the disclosure is constituted by, for example, an AI speaker or a set-top box, data of content to be executed by the execution unit 220 may be stored in the external content database server 140a connected through a wired or wireless network. In general, a carrier providing IPTV services stores a database of contents to be provided in a separate content database server 140a connected through a wired communication network, and when a user selects, for example, a specific movie by manipulating IPTV, data of the corresponding movie is transmitted to the IPTV of the user. In such a system, for example, when a set-top box or an AI speaker attached to an IPTV is constituted by the electronic apparatus of the disclosure, the content to be reproduced may be received from the content database server 140a of the carrier to be played on a display of the IPTV.

As illustrated in FIG. 1, the electronic apparatus may store the category database 120 in the storage 100 provided therein, but may also store the category database 120 in the external category database server 120a as illustrated in FIG. 7. The category database 120 is generally produced by a manufacturer of the electronic apparatus, and as the user uses the electronic apparatus of the disclosure, the category database 120 is continuously updated and new instructions are added as recognizable instructions. When the category database 120 of the update result is configured to be different for each user, the category database 120 is preferably stored in the storage 100 provided in the electronic apparatus. Accordingly, each user can have a category database 120 specialized for him/her. Even if the category database 120 is configured differently for each user, the category database 120 may be stored in the external category database server 120a. When the category database 120 is configured to be updated by including use results of several users, it is preferable that the category database 120 is stored in the external category database server 120a. Even in this case, a method in which the category database 120 is provided in the storage 100 in the electronic apparatus and the external category database server 120a is also provided may be employed.

FIG. 8 illustrates an example in which the electronic apparatus of the disclosure includes a communication interface 295 communicating with other external devices D1, D2, ..., Dn. The communication interface 295 provides a means that enables other external devices D1, D2, ..., Dn to communicate with the electronic apparatus through, for example, Bluetooth, Wi-Fi, infrared communication, or the like. Here, the external devices D1, D2, ..., Dn may be, for example, a display device such as a TV. As an example, when the electronic apparatus of the disclosure is a smartphone, the result of performing the disclosure implemented by the smartphone may be shared with the TV through Bluetooth communication. The communication interface 295 may be configured to perform 1:1 communication with external devices D1, D2, ..., Dn, or may be configured to enable 1:n communication.

According to the disclosure, if the words in the category are uttered after a certain category is frequently used by the user, when the instruction in the utterance is the instruction that has not been previously registered, the instruction is registered as a new instruction in the corresponding category. Accordingly, the voice recognition suitable for various users' intentions is appropriately performed, and the number of cases where it is determined to be the failed utterance is reduced.

Further, even if the instruction included in the currently input utterance does not exist in the category database, the instruction that matches the user's intention is selected. Therefore, even if the instruction is classified as the failed utterance, the instruction that is assumed to be the user's intention is selected and executed without immediately deriving the result of the recognition failure.

Although the exemplary embodiments of the disclosure have been illustrated and described hereinabove, the disclosure is not limited to the above-mentioned specific exemplary embodiments, but may be variously modified by those skilled in the art to which the disclosure pertains without departing from the scope and spirit of the disclosure as disclosed in the accompanying claims. These modifications should also be understood to fall within the scope of the disclosure.

What is claimed is:
1. An electronic apparatus, comprising:
a processor configured to execute one or more programs stored in a memory to:
based on an instruction included in a user voice input being present in a database, increase a score of a category corresponding to a word included in user voice input; and
based on the instruction being not present in the database, check whether the score of the category corresponding to the word is equal to or greater than a preset value, and
based on the checking indicating that the score is equal to or greater than the preset value, register the instruction in the database so that the instruction is included in the category corresponding to the word.

2. The electronic apparatus of claim 1, wherein, based on the instruction being not present in the database and there being a plurality of words included in the user voice input, the processor is configured to execute the one or more programs stored in the memory to:
 check a category of a plurality of categories corresponding to each word of the plurality of words; and
 identify a category of the plurality of checked categories based on scores of the plurality of checked categories.

3. The electronic apparatus of claim 1, wherein the processor is configured to execute the one or more programs stored in the memory to create a new category for the word included in the user voice input based on the word included in the user voice input being not present in the database.

4. The electronic apparatus of claim 1, wherein based on the instruction being not present in the database and there being a plurality of instructions included in the category corresponding to the word, the processor is configured to execute the one or more programs stored in the memory to select one of the instructions of the plurality of instructions as an instruction for the word.

5. The electronic apparatus of claim 4, wherein, based on the instruction being not present in the database, and there being a plurality of words included in the user voice input and a category of a plurality of categories corresponding to each word of the plurality of words, the processor is configured to execute the one or more programs stored in the memory to select a category of the plurality of categories based on scores of the categories.

6. The electronic apparatus of claim 4, wherein the processor is configured to execute the one or more programs stored in the memory to receive user's check for the selected instruction.

7. The electronic apparatus of claim 1, further comprising:
 a storage configured to store the database, and the database includes respective fields for the word, the instruction, the category, and the score.

8. The electronic apparatus of claim 1, further comprising:
 a communication interface configured to perform communication for querying the database on an external database server in which the database is stored.

9. The electronic apparatus of claim 1, further comprising:
 an executor configured to execute an operation corresponding to the word and the instruction.

10. The electronic apparatus of claim 9, further comprising:
 an output interface configured to output a result of the operation executed by the executor.

11. The electronic apparatus of claim 9, further comprising:
 an interface configured to transmit, to an output device, the result of the operation executed by the executor so that an external output device displays the result of the operation.

12. The electronic apparatus of claim 1, further comprising:
 a microphone configured to receive a sound of an utterance and transmit the received sound to a recognitionor.

13. The electronic apparatus of claim 1, further comprising:
 a receiver configured to receive a signal for a sound from an external device including a microphone receiving a sound of an utterance and transmit the received signal to a recognitionor.

14. A method for controlling voice recognition of an electronic apparatus, comprising:
 based on an instruction included in a user voice input being present in a database, increasing a score of a category corresponding to a word included in the user voice input; and
 based on the instruction not being present in the database, checking whether the score of the category corresponding to the word is equal to or greater than a preset value, and
 based on the checking indicating that the score is equal to or greater than the preset value, registering the instruction in the database so that the instruction is included in the category corresponding to the word.

15. The method of claim 14, wherein, based on the instruction not being present in the database and there being a plurality of words included in the user voice input, the method further comprising:
 identifying a category of a plurality of categories corresponding to each word of the plurality of words, based on scores of the plurality of categories.

16. The method of claim 14, further comprising:
 creating a new category for the word included in the user voice input based on the word included in the user voice input being not present in the database.

17. The method of claim 14, wherein, based on the instruction being not present in the database and there being a plurality of instructions included in the category corresponding to the word, the method further comprising:
 selecting an instruction of the plurality of instructions as an instruction for the word.

18. The method of claim 17, wherein, based on the instruction being not present in the database, and there being a plurality of words included in the user voice input and a category of a plurality of categories corresponding to each word of the plurality of words, the method further comprising:
 identifying a category of the plurality of categories based on scores of the plurality of categories.

19. The method of claim 17, further comprising:
 receiving a user's check for the selected instruction; and
 executing an operation on the word in the user voice input according to the selected instruction.

20. A non-transitory computer-readable medium recording instructions for execution by a processor of an apparatus to cause the apparatus to perform operations comprising:
 based on an instruction included in a user voice input being present in a database, increasing a score of a category corresponding to a word included in user voice input; and
 based on the instruction not being present in the database, checking whether the score of the category corresponding to the word is equal to or greater than a preset value, and
 based on the checking indicating that the score is equal to or greater than the preset value, registering the instruction in the database so that the instruction is included in the category corresponding to the word.

* * * * *